Figure 1:
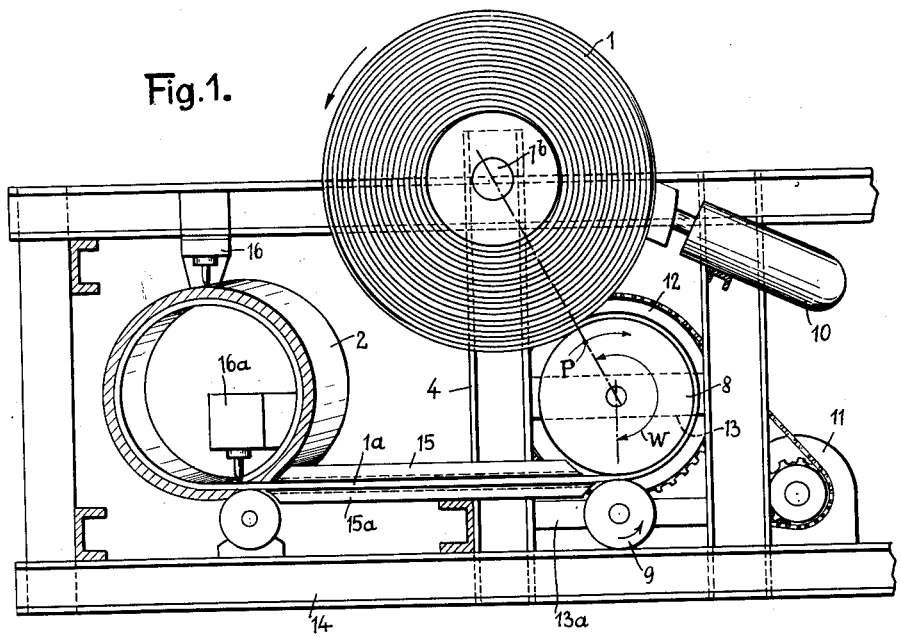

April 17, 1962 A. KÜCKENS 3,030,488
METHOD AND APPARATUS FOR PRODUCING TUBES
WITH A HELICAL WELDING SEAM
Filed Feb. 4, 1959 13 Sheets-Sheet 1

Inventor
A. Kückens
by
Glascock Downing Seebold
Attorneys

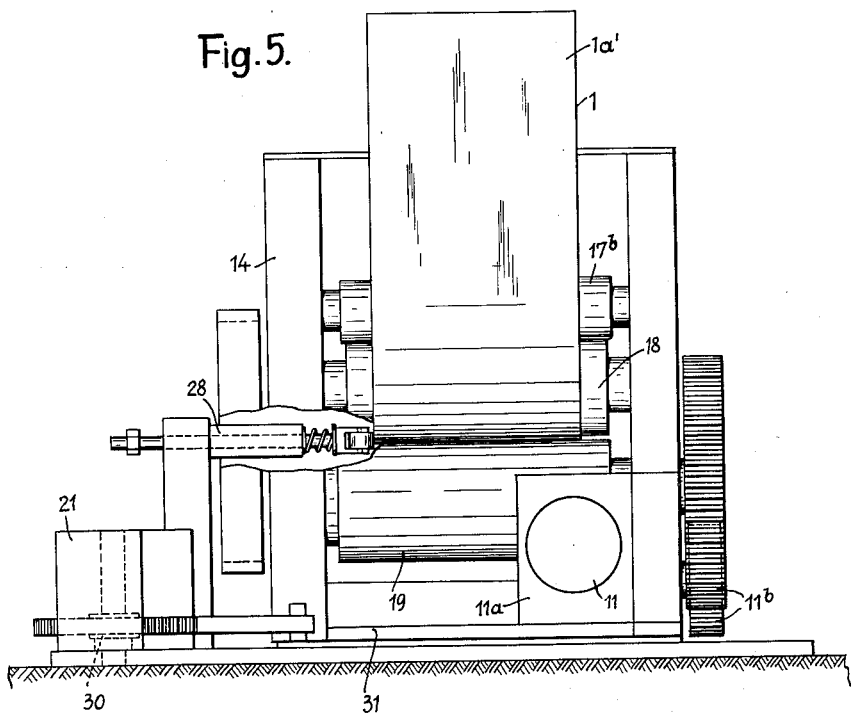
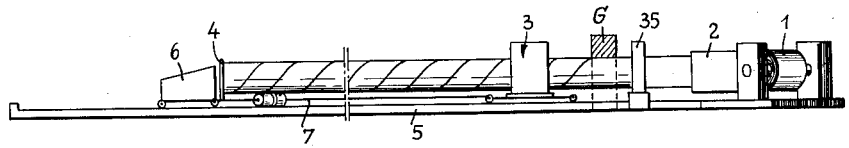
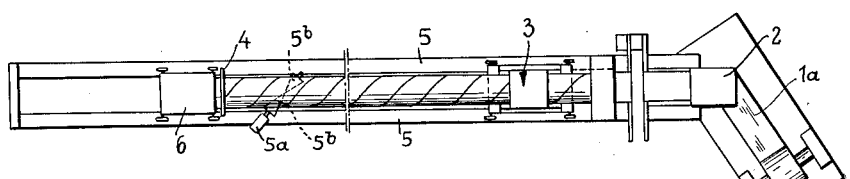

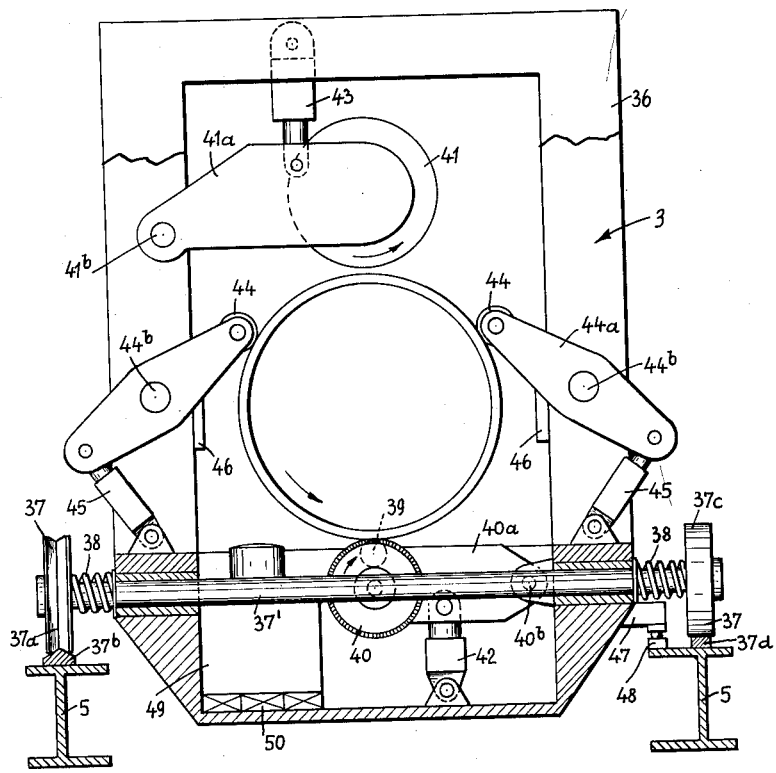

April 17, 1962 A. KÜCKENS 3,030,488
METHOD AND APPARATUS FOR PRODUCING TUBES
WITH A HELICAL WELDING SEAM
Filed Feb. 4, 1959 13 Sheets-Sheet 8

Inventor
A. Kückens
by
Attorneys

April 17, 1962  A. KÜCKENS  3,030,488
METHOD AND APPARATUS FOR PRODUCING TUBES
WITH A HELICAL WELDING SEAM
Filed Feb. 4, 1959  13 Sheets-Sheet 9

April 17, 1962 A. KÜCKENS 3,030,488
METHOD AND APPARATUS FOR PRODUCING TUBES
WITH A HELICAL WELDING SEAM
Filed Feb. 4, 1959 13 Sheets-Sheet 10

Inventor
A. Kückens

Inventor
A. Kückens

United States Patent Office 3,030,488
Patented Apr. 17, 1962

3,030,488
METHOD AND APPARATUS FOR PRODUCING TUBES WITH A HELICAL WELDING SEAM
Alexander Kückens, Hamburg, Germany, assignor to Willy H. Schlieker K.G., Hamburg, Germany
Filed Feb. 4, 1959, Ser. No. 791,169
Claims priority, application Germany Apr. 5, 1958
22 Claims. (Cl. 219—62)

The present invention relates to method and apparatus for producing tubes with a helical welding seam, and more particularly to provide improved means for producing such tubes primarily in continuous lengths and also for producing severed lengths of such tubes by a substantially continuous operating procedure.

In the production of such tubes from a continuous steel strip by means of a shaper box into which the strip is fed and in which it is formed into a flat strip helix of tubular formation, it is known that additional devices are necessary such as trueing or flattening roll trains and auxiliary driving rolls or the like in order that the material can be introduced into the feeder rolls or into the trueing rolls positioned in front of the same. In many cases it is necessary, especially when using comparatively thick steel strips to pre-heat the strip initially in order to obtain better yield properties in the material and thus an easier introduction into the auxiliary drive rolls placed in front of the trueing roll train.

The primary object of the present invention is to avoid the necessity for these additional devices and to provide a transportable machine by which tubes can be welded at the point of use and can be produced in the finish-worked form.

In its broadest aspect, the invention is directed to a construction wherein the steel strip reel or spool rests by its own weight on its associated driving assembly and is driven merely by contact therewith, and between the driving assembly and the shaper box there is provided a trimming device as well as a welding device for bonding the rear or trailing end of a strip running from one spool or reel to the front or leading edge of a new length of strip from the next spool or reel, and beyond the shaper box there is provided a device for severing the tubes to the required length and which at the same time finishes off the tube end.

The drive of the spool or reel may be performed in various ways; in one arrangement the outermost turn of the strip may rest directly on the driving roll itself and may enclose the roll for about one-half its peripheral span, or it may rest on one or more take-off rolls driven from the driving roll whereby the natural roll-off curvature is utilized to effect the introduction of the strip into the rolls. The steel strip reel is thus positively driven from the take-off rolls driven from the driving roll at the same peripheral speed as the driving roll.

By this means and while avoiding the previously known auxiliary technical means, absolute uniformity is secured between the speed of the feeder rolls and the roll-off speed of the steel strip spool or reel. At the same time, strip bending or introduction devices to the feeder rolls, which were previously necessary particularly when using comparatively thick strip material, can be avoided since the natural roll-off curvature of the steel strip is utilized for feeding into the rolls.

Thereby, it is also possible to avoid the need for the trueing or flattening roll system with the associated auxiliary drive rolls for introducing the leading end of a new coil since now the strip can be introduced into the feeder rolls in such a manner that the roll-off of the steel strip is effected at a radius which permits the strip to be introduced into the driving rolls within its natural elasticity limits and without the formation of kinks. Any strip which normally would be withdrawn from a take-off supply in the horizontal direction is subject to the danger of kinking. For these reasons, trueing or flattening rolls are interposed behind the known unreeling devices in order to roll such kinks again from the steel strip. With the coil feed arrangement described, kinking in the strip is virtually avoided without it being necessary to include the trueing rolls which occupy a substantial amount of space.

By this arrangement, a further advantage is secured by the fact that as a result of the relatively small spacing between the spool or reel and the shaper box, the lateral guidance of the strip, which is of the greatest importance for satisfactory welding, is substantially simplified since the strip is held only at one fixed point in the feeder rolls and one fixed point in or directly in front of the shaper box.

Another object of the invention is to provide an arrangement utilizing a leader or feeder plate arranged in front of the feeder rolls which can be fed forward on rollers between the feeder rolls and thereby serves for the further forward drive of the end of the steel strip. By reversing the feeder rolls, the leader or feeder plate can be then returned to its starting position. By this arrangement, the previous difficulty is avoided in that the steel strip coming from the reel no longer receives a drive after it has passed away from the feeder rolls.

A further object is to provide between the feeder rolls and the shaper, a welding zone and associated welding means whereby the trailing end of a preceding steel strip can be welded to the leading end of the next following strip whereby any desired length of tube can be produced by the apparatus without any substantial interruption of operation and loss of material. If the end part of the steel strip spool or reel is unusable, the steel strip is fed forward until the still usable end part of the strip is still in the welding zone and at this point, the end tongue or unusable end of the strip is cut off and can be discarded to the rear by reversing the rolls. The leading end of the strip from the next coil is fed forward up to the welding zone and welded to the preceding end in said zone. A motor with an associated brake permits the feed of the new strip precisely to the edge of the previous strip end, and in this case also, an endless tube can be produced without using a leader or feeder plate.

A still further object of the invention is to secure satisfactory internal and external welding within the shaper box by the provision of reliable control means for the automatic adjustment of the feed-in angle and thus of the weld-gap spacing. The steel strip runs into the shaper box which is positioned at a definite angle to the strip entry direction and the strip is thereby formed to helical form and the trailing strip edge is curved and deflected so as to come adjacent the yet straight incoming strip edge. Since the welding procedure is to be effected at this point, exact guidance of the edge spacing is of the greatest importance. The known methods of spiral tube production methods attempt to secure this result by continuous observation of a control means for the weld-gap spacing operated so that the outgoing tube is moved by corresponding pressure towards the right or the left. This manually operated method is inexact and, as stated, presupposes a continuous supervision. It is also known that the outgoing tube can also be controlled automatically by the provision of electric feeler elements at the strip edges which effect a compensating tube movement by altering the feed-in angle by means of a motor driven control element. This method also is not acceptable and does not avoid the danger of poor weld formation since in some circumstances the feed-in angle may vary so greatly that it can no longer be satisfactorily adjusted by the control means.

In this connection, it must be remembered that particularly with tubes of larger diameters and wall strengths, the elasticity of the tube is so small that for the control movements, the whole tube length must be displaced, which may be up to 25 m., whereby an unacceptable high effort must be exerted on the tube end and the necessary forces cannot readily be obtained by normal control techniques. Such cases may, for example, occur when as a result of a strong camber or transverse curvature of the strip or through lateral displacements of the steel strip running through the conveyor rolls or a more or less great width tolerance of the strip, wandering of the strip occurs at the point of entry into the shaper box. Unlimited guide forces cannot be exerted on the strip by the provision of lateral strip guides since in this case, this may be associated with an unduly strong or even one-sided distortion or upsetting or tilting of the edges.

A further object of the invention is to avoid this difficulty in a completely satisfactory manner by the fact that a fully automatic combined control procedure is used which ensures an absolutely uniform gap spacing even under unfavorable conditions. If the entering strip is regarded as one limb of an angle and the outgoing tube is regarded as the other limb, previously the control movements were applied manually or automatically to the tube limb, whereas with the present invention, the other limb is moved instead or in addition.

Another object is to provide a construction having a pivot at the mid-point of the shaper box and to transmit control impulses derived from feeler means engaging the strip edges to the rear part of the machine. In this way, not only is the tube limb of the angle controlled, but also the limb formed by the entering steel strip. By uniform or progressive control impulses, wandering of the strip and alterations in the entry angle are allowed for so that the spacing at the welding edges can be controlled with great precision, thereby essentially increasing the economical employment of the plant by avoiding the production of rejected tubes. This automatic control method of the machine according to the present invention is particularly important since by omitting the trueing roll train, the feed-in means, the auxiliary drive and other elements, the overall length and weight are reduced to the minimum and this in itself permits a simplification of the control operations. By this combined regulation system, absolute control and adjustment of the welding gap to any required value can be maintained even under unfavorable conditions.

In this connection, the invention provides a guard or protective system for preventing the production of rejected tubes as a result of the formation of poor or useless welding seams. It is known to control the length of an electric arc so that the quality of the welding seam can be controlled in known manner. Additionally, according to the invention, all the mechanical procedures are supervised in the same way since they become dependent on the welding arc.

As regards the end treatments of the finished tubes during severance thereof, it should be noted that it is usual at the present time, first to sever the tube and then to commence the end treatments. A still further object of the invention is to permit a new procedure wherein the end treatment of the tubes has commenced during the course of production of the tube and only subsequently is the severance process initiated.

By reason of the type of construction envisaged, it becomes possible to guide the steel strip so precisely at the entry point to the shaper box that lateral displacement of the incoming steel strip becomes impossible. The known spiral tube machines must, in order to obtain a completely automatic welding gap control, measure the gap spacing in a known manner, and for this purpose, a number of systems are known, and the results of these measurements must be transferred to control or regulator elements also known per se, for example feeler elements applied to the strip edges, which measure the edge spacing or the gap width. Control signals can also be produced as a result of irregularities of the steel strip edges, which set the control elements into operation although no true alteration in the gap would appear. Such irregularities on the two edges can be additive in the negative sense and thus produce false control impulses.

A still further object of the invention relates to the control of the two edges of the strip or to the measurement of the welding gap and simultaneously prevents the recording of transitional irregularities in the strip edges as a result of slight roughness, wave formation, pitting or the like since only the general direction of the incoming strip edge is controlled as regards its direction, thus allowing for the exact entry of the strip at the entry point into the shaper box.

Departures from the aforesaid direction are transmitted in known manner to a regulating element on the outgoing tube so that the tube in every case is pressed in a direction which corrects the entry of the strip edge coming from above. At the same time, a timing device is operated which transmits this control impulse after a short delay so that irregularities, even at one edge, produce no unnecessary or false control impulses. In this way, it becomes possible to eliminate the measuring of the strip edges by means of two feeler devices in the previously known manner.

By the type of strip guide means employed, it is also possible to produce a tube with a closer diameter tolerance than has heretofore been possible. It is known that the tube diameter is a function of the strip width, the internal diameter of the shaper box and the entry angle of the strip into the shaper box. Since with known systems more or less substantial wandering of the strip may occur at the entry point to the shaper box, these movements are transmitted to the outgoing tube as a control impulse after measuring the spacing of the strip edges. Thereby an angular variation is obtained which furthermore has a more or less great influence on the tube diameter.

By holding constant the approximately horizontally entering strip edge, lateral wandering is in the present case no longer possible so that only the minimum displacement of the strip coming from the top is possible. These displacements are so small that, in contra-distinction to the known devices, only minimum control impulses are transmitted to the outgoing tube and thus the angular displacements concerned are scarcely measurable. This furthermore has the result that finished tubes produced on the spiral tube machine described have such a close tolerance that variations in the diameter are scarcely measurable. It has been found in practice by investigation made at Government establishments that the tube has at the most only about one-tenth of the internationally permissible tolerance.

In the known methods for producing tubes with a helical welding seam, technical difficulties in finishing may result from the fact that the edges of the steel strip to be welded are apt to become offset one from the other in the shaper box. Further, the edges may even be damaged or distorted, particularly in the case of a large tube where the tube exit drive from the shaper box exerts with increasing length, an increasing pressure on the steel strip entering the shaper box. Further difficulties may be produced from the fact that a shaper box consists either of a bored or rifled sleeve or of rolls, cages or the like which however permit no modification in the diameter or only a limited modification.

As regards the increasing counter pressure through the tube leaving the shaper box, as is known, the steel strip entering the shaper box is pressed down by rolls, balls or the like. When using rolls they are placed in a known manner obliquely to the axis of the shaper box to permit a better entry of the strip and they are arranged in most cases parallel to the entering strip edge.

which is guided directly before entry into the shaper box against two guide jaws. Such obliquely positioned rolls can indeed be varied as regards their setting angle. This, however, requires individual supervision and continuous adjustment without however uniform feeding of the strip being reliably obtained. On the other hand, the entry of the strip can, for example be adversely affected by the fact that the increasing weight of the tube leaving the shaper box exerts an increasing counter pressure on the entering strip and thus adversely affects the uniform welding and forming procedure. These disturbances are due in the first place to the fact that the pressure of the steel strip acting in the axial direction of the tube presses from one side so strongly against the guide jaw concerned that this edge is damaged and upset.

These conditions are eliminated according to the invention by the fact that at least one edge of the incoming strip directly in front of the entry to the shaper box, for example at the guide jaw, a pressure measuring means, conveniently a presser head, is applied which constantly registers the edge pressure of the steel strip and regulates the same. The pressure on this measuring means by the strip edge passing it is greater the greater is the resistance applied to the shaper box by the outgoing tube by the increasing weight thereof.

The invention therefore further provides that independently of this pressure, the seating angle of the shaper rolls is so adjusted that by this angular adjustment of the rolls piling up or upsetting of the edges at the entry point is no longer possible and thus the welding process is no longer affected by torn or distorted edges of the strip. On the other hand, an absolutely uniform shaping procedure is obtained and thus the welding process within the forming tool occurs always under uniform conditions.

It has already been stated that deflection of the edges of the steel strip in the shaper box can also occur by the fact that the roll carrier which effects the first stage of the forming of the strip is not forced to the right or left edge of the strip with the desired pressure.

A further essential feature of the invention consists therefore in the fact that the roll carrier, as seen from the mid-point, is readily pivotal and thus can be adjusted with the edge displacement in such manner that by a compensating one-sided pressure, the strip edge entering towards the right or left is so depressed that the strip edges coming from above and from below travel is mutually at the same level.

It is known to cause the entering steel strip to pass into a shaper box through a sleeve or shell selected according to the tube diameter. It is also known to allow the strip steel to pass into a shaping or forming cage which consists of rotary rolls or roll segments which permits a certain range of adjustment.

In contradistinction to these known devices, the invention permits a wide range of adjustment by the fact that the roll carriage modifies the first forming stage by differential pressure of the forming means lying at the top against two counter rolls lying beneath the same to modify the diameter in such manner that the means lying outside of this region only slightly shape the tube towards the tube diameter to be produced, that is they merely exert a subordinate influence. The calibrating rolls are fitted to laterally applied plungers which can be adjusted in a simple manner without special mountings or complicated exchange methods being necessary.

It is known that a steel strip will furthermore and frequently wander to one or other side of the rolls feeding the strip so that the strip is displaced to the left or to the right. Both possibilities have the result that one-sided strong edge pressures appear which may be so great that the edges of the strip are damaged and thus the welding process is severely affected in the shaper box.

Furthermore, the steel strip positively guided in its path to the feeder rolls, is subjected to stresses in its path to the shaper box, which, when the strip enters the shaper box are again released and the strip expands and travels towards the right or left so that the welding gap progressively varies and an accurate positioning of the weld joint, especially when welded internally and externally, is not possible.

In order to eliminate these difficulties, the invention provides that the reactions of the forces appearing as a result of constraints in the strip and/or displacement of the strip are utilized for regulating the accuracy of travel of the steel strip in that for example the pressures of the steel strip appearing on one side are measured by one or more stops guiding the strip edges and are utilized for controlling the strip feeder.

The method according to the invention assumes that all devices answerable for the production of constraints in the strip, for example the feeder rolls, the auxiliary drive means, the trueing or flattening rolls, strip guides or the like are arranged in a floating manner so that they are able to react to the horizontal forces due to the formation of constraint forces in the strip and can automatically correct themselves in such manner that the steel strip is completely unconstrained on entering into the shaper box. Only then is an always uniform edge gap obtained over the whole length and thus a satisfactory welding seam secured.

Devices for carrying out the method of the invention may naturally take many forms. Thus, for example, the feeder roll stand may be rotatable about a vertical axis so that on the appearance of any tendency for lateral wandering of the steel strip, it can be rotated and thus eliminate the wandering of the strip.

Provision can also be made that, for example the feeder rolls alone may be adjustable hydraulically towards the right or the left or can receive from above automatically a differential pressure which can exert a compensating tendency upon the travel of the steel strip. In each case, the engagement of the strip edge can be effected, for example by pressure heads which are arranged in front of the entry of the strip into the roll stand or at other points of the strip travel.

Figure 2:
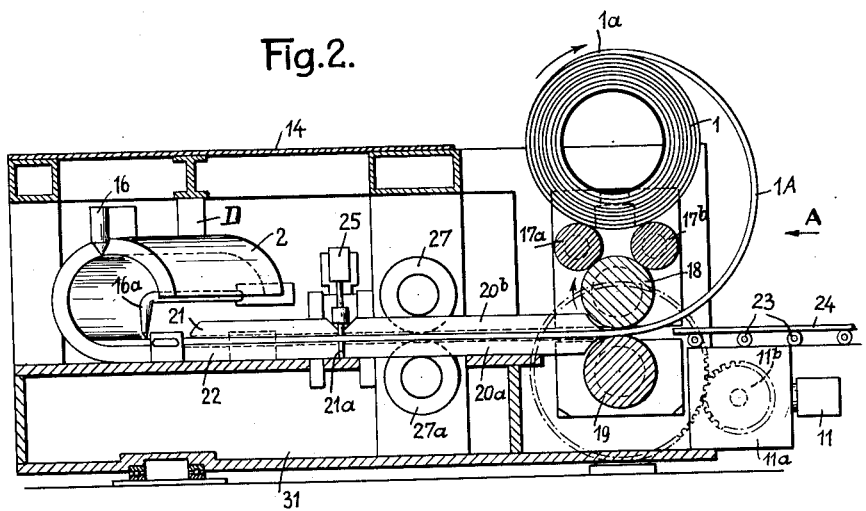
Figure 3:
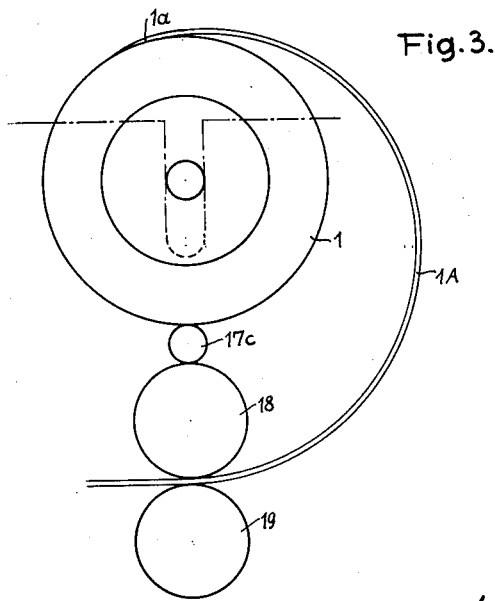
Figure 4:
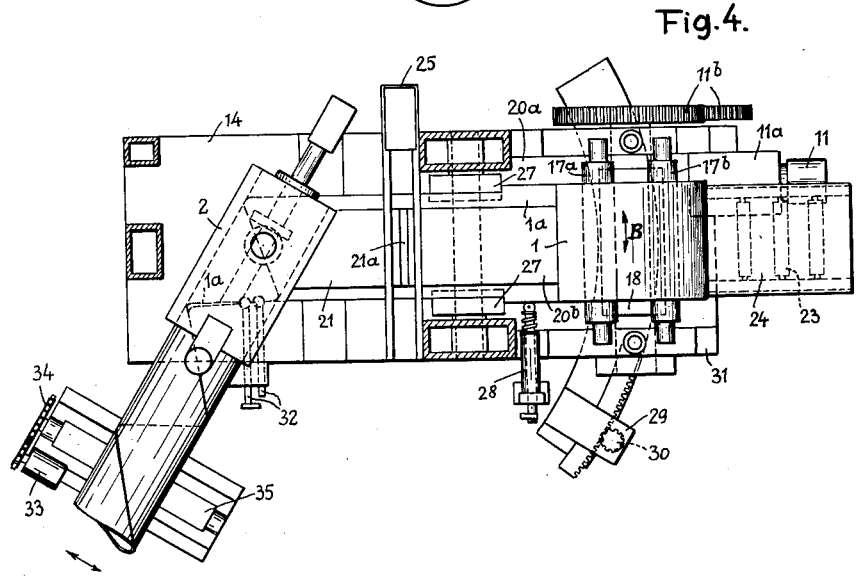
Figure 9:
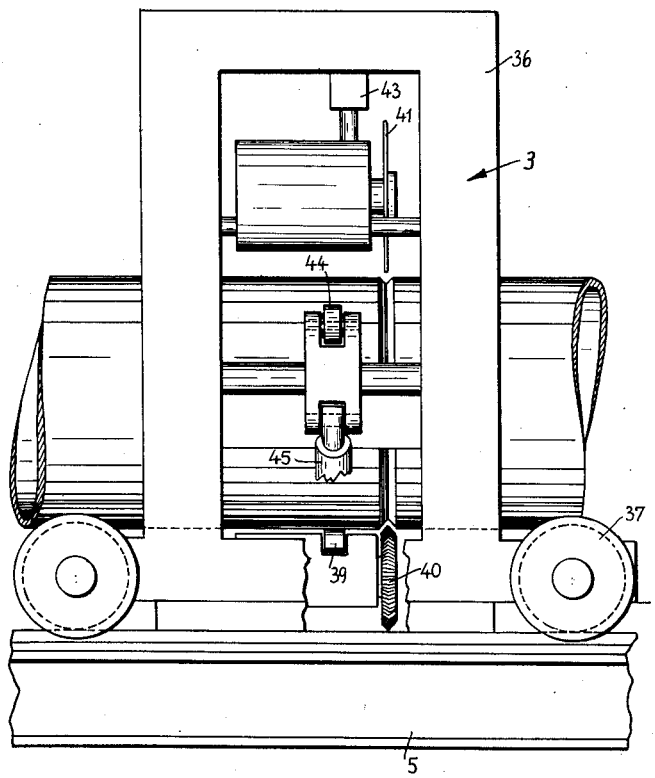
Figure 10A:
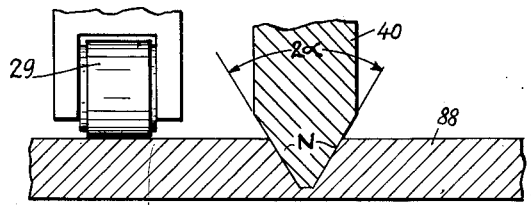
Figure 10B:
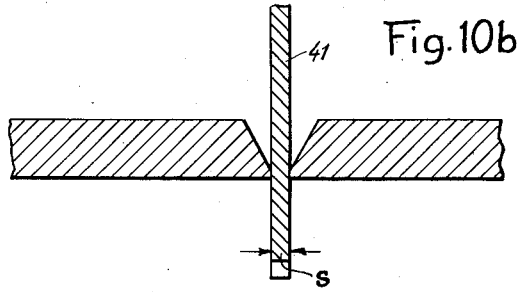
Figure 10C:
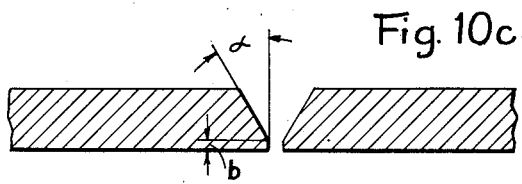
Figure 11:
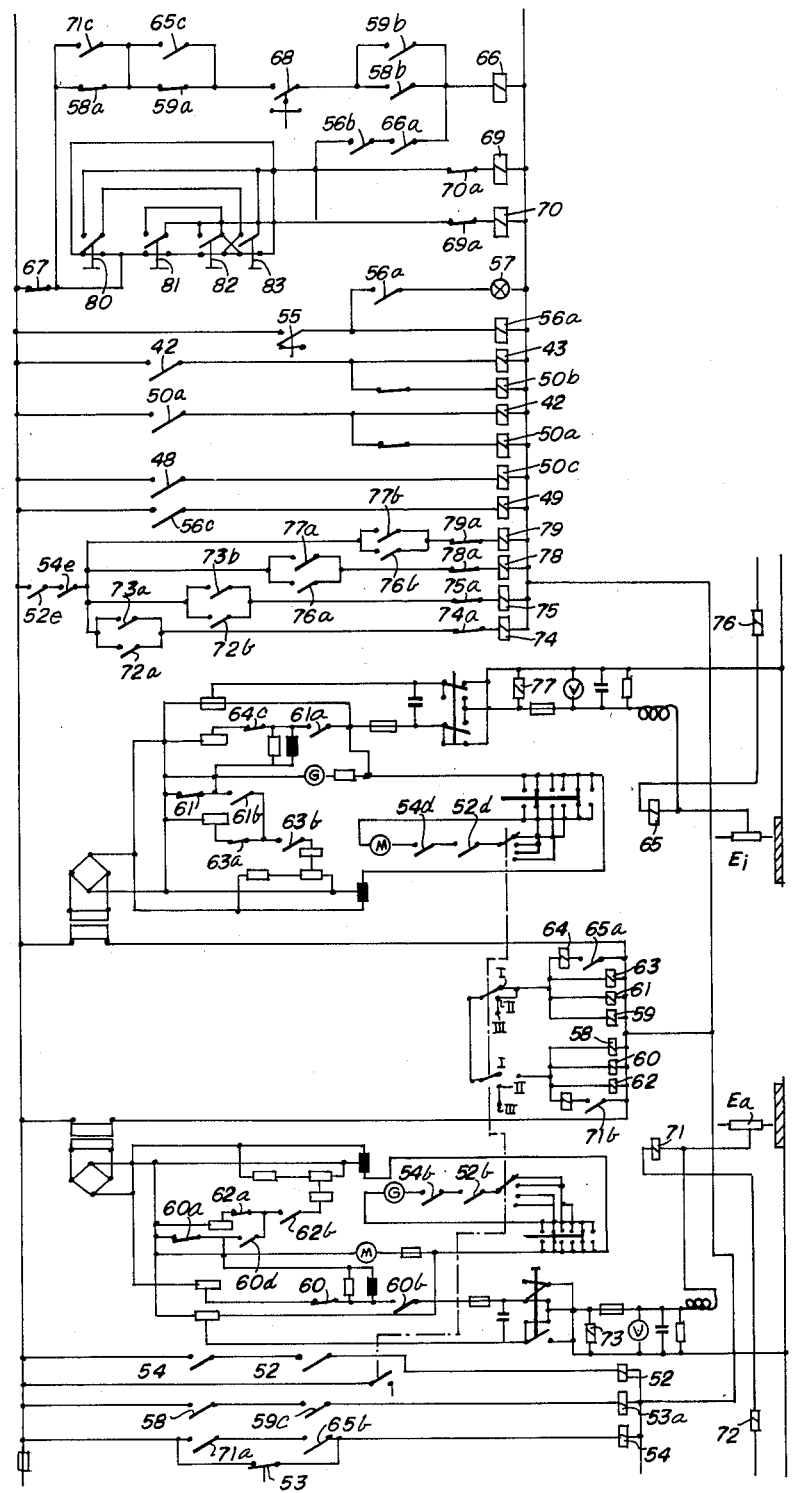
Figure 12:
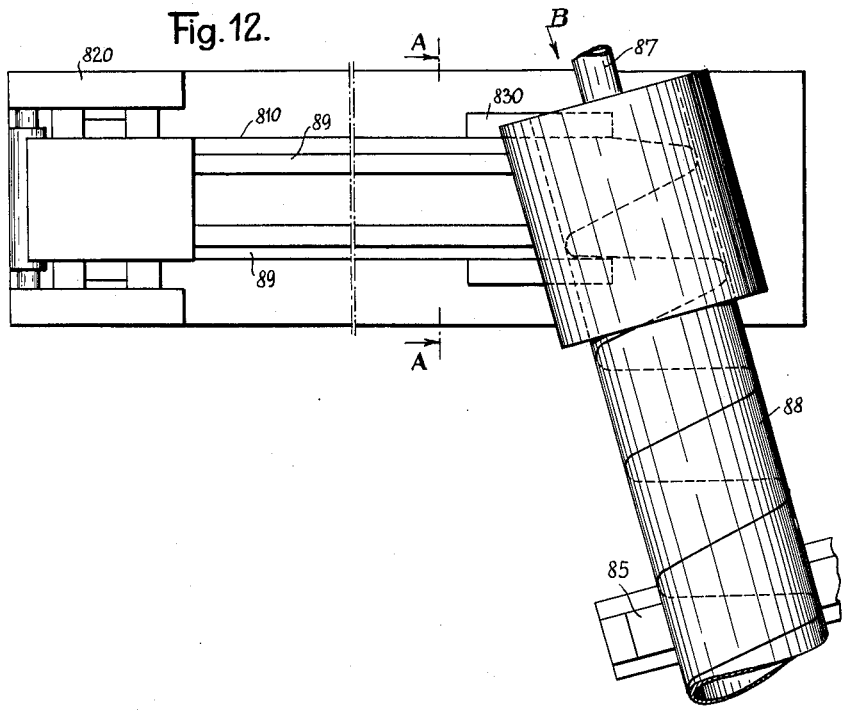
Figure 13:
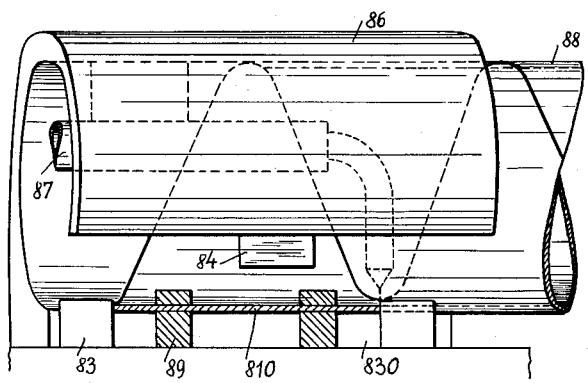
Figure 14:
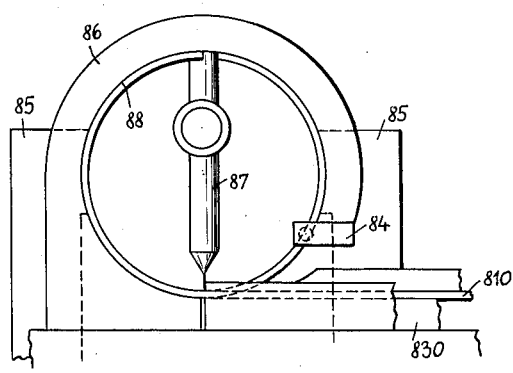
Figure 15:
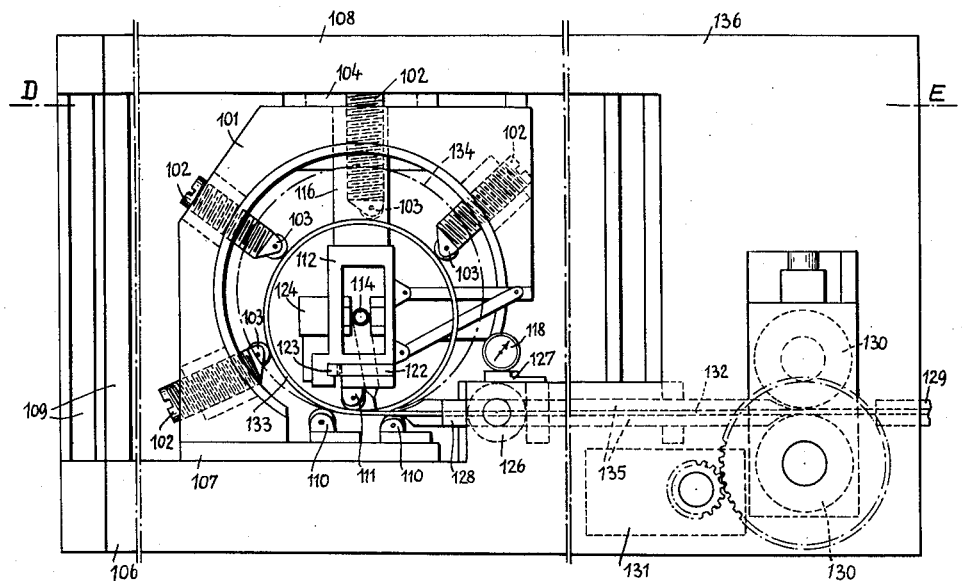
Figure 16:
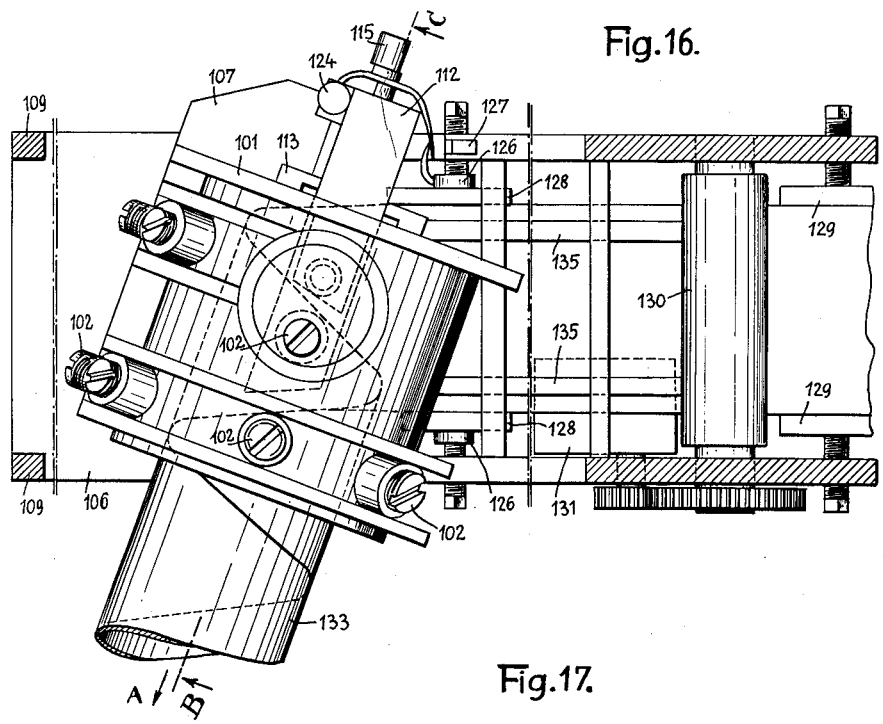
Figure 17:
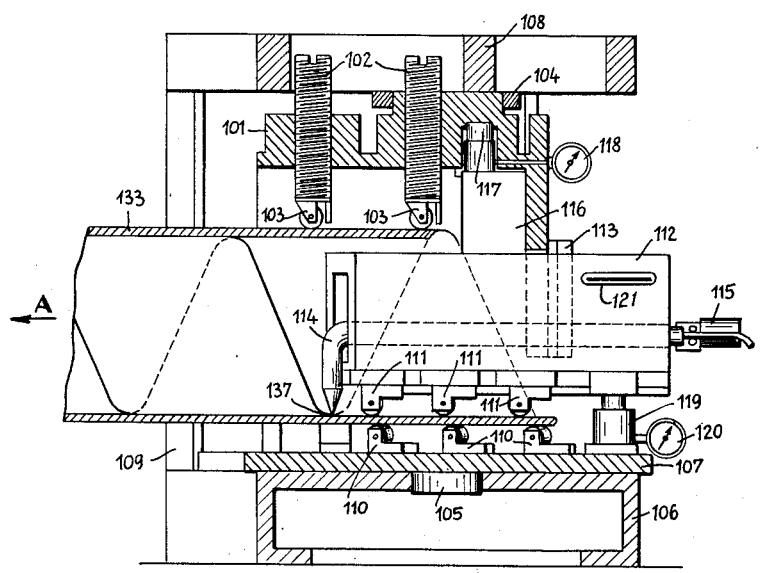
Figure 18:
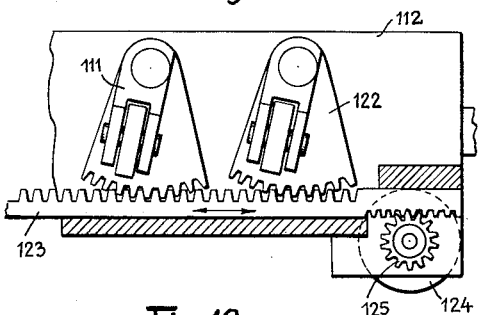
Figure 19:
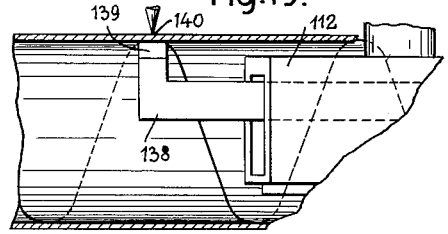
Figure 20:
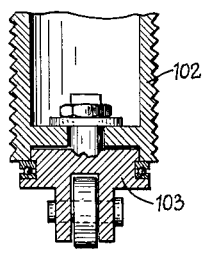
Figure 21:
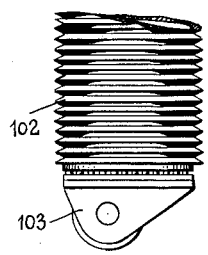
Figure 22:
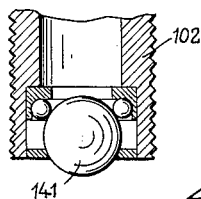
Figure 23:
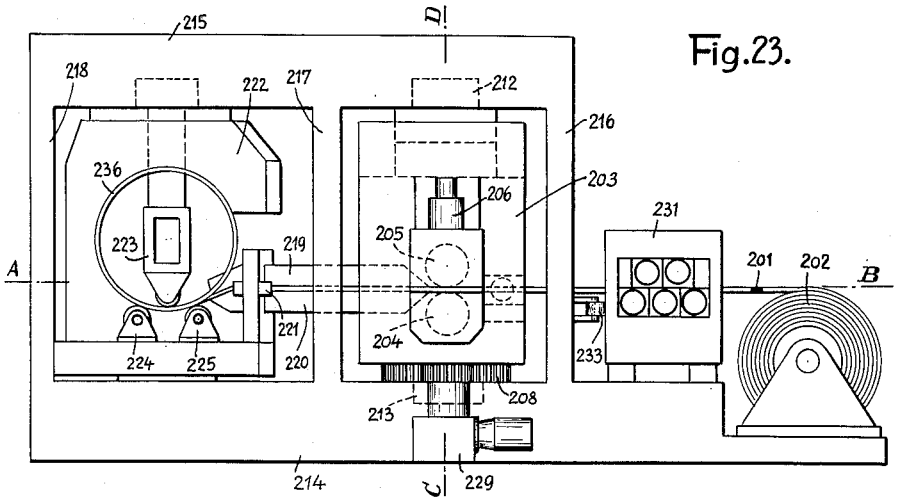
Figure 24:
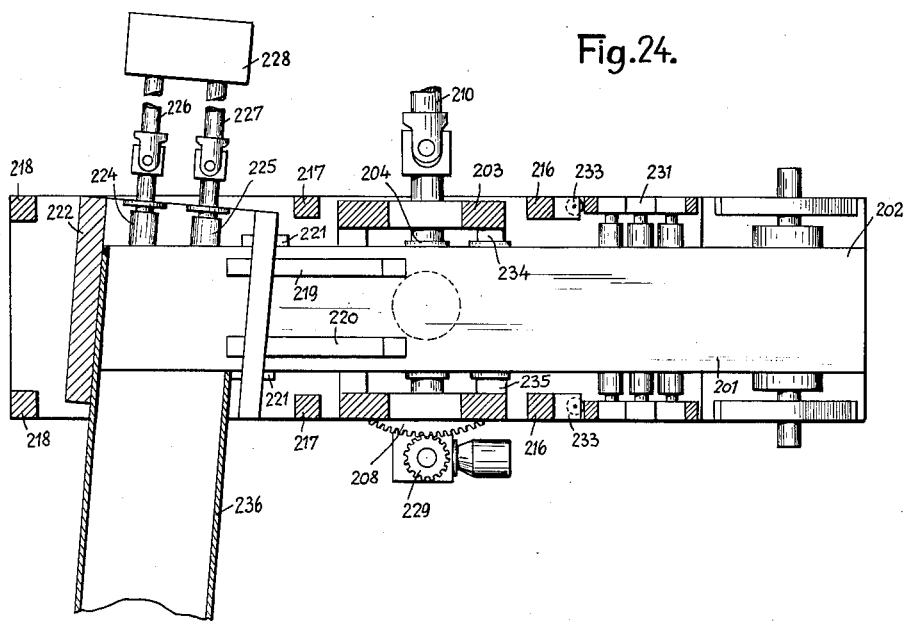
Figure 25:
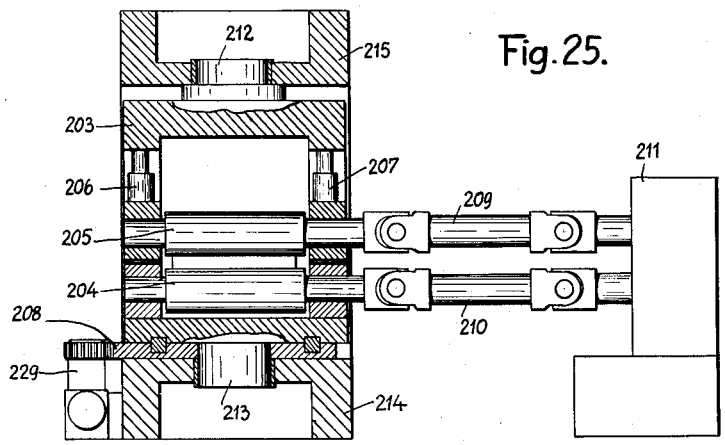
Figure 26:
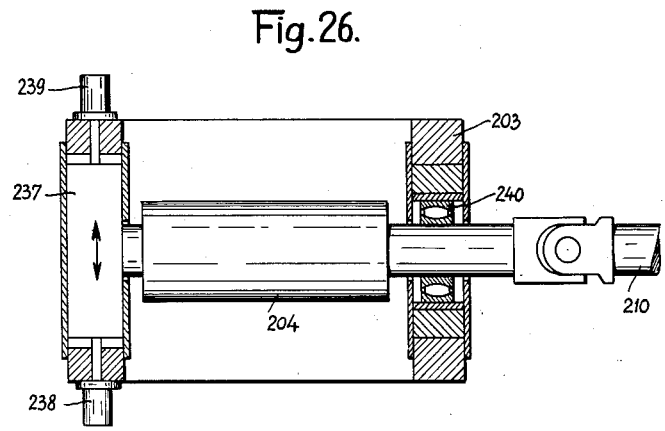

One preferred construction of apparatus according to the present invention and suitable for performing the method thereof is shown by way of example diagrammatically on the accompanying drawings, wherein:

FIG. 1 is an end view of the reel drive of the machine wherein the reel rests directly on the feeder roll, FIG. 2 is an end view of another reel drive in which the reel rests on two take-off rolls driven by the feeder rolls, FIG. 3 is a partial end view of a reel drive in which the reel rests on a single take-off roll driven from the feeder roll, FIG. 4 is a plan of FIG. 2, FIG. 5 is an elevation of FIG. 2 in the direction of the arrow A, FIG. 6 is a diagrammatic view of the whole machine on a reduced scale and seen from the side, FIG. 7 is a plan of FIG. 6, FIG. 8 is a cross-section through the cut-off section of the machine, FIG. 9 is a side view of FIG. 8, FIG. 10a is a diagrammatic view of the cut-off procedure, FIG. 10b is a view similar to FIG. 10a but showing the operation of the cutting disk to complete the severing operation, FIG. 10c is a view similar to FIG. 10a and showing the two ends of the tube after completion of the cutting operation, FIG. 11 is a circuit diagram showing the interconnection of the parts forming the control mechanism, FIG. 12 is a part of the device seen from above, FIG. 13 is a partial section of the shaper box in section on the line A—A of FIG. 12, FIG. 14 is an end view of FIG. 13 seen in the direction of the arrow B, FIG. 12, FIG. 15 shows the shaper box as seen from the side, FIG. 16 is a plan of FIG. 15 in section on the line D—E, FIG. 17 is a section on the line B—C in the direction C of FIG. 16, FIG. 18 shows the right-hand end of the roll carrier of FIG. 17 seen from below, FIG. 19 shows the left-hand end of the roll carrier, FIG. 20 shows the end of a plunger with a pivotally carried roller in section, FIG. 21 is a side view of FIG. 20, FIG. 22 shows the end of a plunger with a presser ball, FIG. 23 is a futher side view of the device, FIG. 24 is a plan view of the device according to FIG. 23, FIG. 25 is a section on the line C—D through the feeder roll stand according to FIG. 23, and FIG. 26 is a horizontal section through another feeder roll stand.

In order that the invention can be more fully understood, the features of operation of the machine according to the present invention will first be described.

A steel strip 1a is drawn from a spool or reel 1 and fed into a coiling die or shaper box 2, the axis of which is arranged at an angle to the axis of the reel 1 as shown more particularly in FIGS. 6 and 7. Thereby, the steel strip 1a is formed into a continuous tubular helix with a gap 1a' between the opposed strip edges as shown in FIG. 4, these edges being then welded together both from the inside and from the outside. The tube so formed passes out of the shaper box 2 onto a carriage denoted generally 3 from which it passes onto a stop 4 set preliminarily to the desired tube length and is then severed on the carriage 3.

The detailed features of the machine will now be described. In the reel drive means shown in FIG. 1, the reel 1 rests directly on a driven take-off roll 8 which forms together with a counter roll 9, the reel drive assembly. A bearing pin 1b for the reel 1 is slidably mounted for vertical movement in stands 4 so that the reel always rests by its own weight on the take-off roll 8. When the diameter of the reel 1 decreases during the running off of the strip, the weight exerted thereon likewise decreases. A braking or retarding device 10 is used as commonly employed on such mechanisms.

Since the reel 1 is slightly offset relatively to the take-off roll 8, an angle of contact W is formed through which a peripheral force P is exerted as a result of the consequent friction which hinders slipping of the strip in its path to the shaper box. In addition, by the large included contact angle W, the strip is subjected to a substantial initial flexure stress which acts in a favorable manner when shaping or deforming the strip in the shaper box 2.

From the reel 1 the strip 1a passes to the positively driven take-off roll 8 which is driven for example by means of a motor 11 through a chain or belt drive 12. The take-off roll 8 is rotatably supported with the counter pressure roll 9, on cross members 13 and 13a of machine frame 14. Beyond the pair of rolls 8, 9, the strip is fed to the shaper box 2 through a guide formed by means of two guide rails 15 and 15a, the strip passing through the shaper box 2 in known manner to effect the helical winding of the strip, the seaming being effected from the outside or from the inside or from both sides by means of welding devices 16, 16a.

The reel drive as shown in FIG. 2 differs from that of FIG. 1 in that the reel 1 rests on two take-off rolls 17a, 17b which rest on a feeder roll 18 in turn driven from the electric motor 11 by means of a gear box 11a and gearing 11b. A counter pressure roll 19 is provided beneath the feeder roll 18. If the feeder roll is driven in the direction of the arrow, the steel strip reel 1 is moved by means of the take-off rolls 17a and 17b in the same direction and with the same speed.

As shown in FIG. 3, the reel 1 rests on a single take-off roll 17c which is driven in the same way as in FIG. 2.

In both cases of FIGS. 2 and 3, the steel strip 1a running from the reel enters at its natural take-off curvature 1A between the rolls 18 and 19 and then passes through guides 20a and 20b as well as guides 21 and 22 into the shaper box 2 in which the welding procedure is effected likewise by means of the welding devices 16, 16a. Satisfactory welding in all cases depends on the gap formed between the individual tools shown in FIG. 4 at 1a' and this gap is therefore automatically controlled in a manner which will be explained below.

It will be apparent that the feed of the steel strip 1a is interrupted when the end of the strip passes from between the rolls 18 and 19 and in order that the associated resulting operational disturbances in the shaper box 2 can be avoided, a feeder plate 24 supported on rollers 23 can be introduced, for example by hand, into the gap between the rolls 18 and 19 so that the feeder plate 24 is driven by the rolls 18 and 19 and feeds the end of the strip up to the welding device 25. After the reversal of the feeder roll 18, the feeder plate 24 is returned to the starting position shown. The leading end of a new steel strip is now fed up to the welding zone or duct 21a and welded to the trailing end of the preceding steel strip by means of the welding device 25 above and movable along the welding duct. In this way, it becomes possible to produce tubes of desired or of fixed length without losses of material or serious interruption in operation. This feature according to the invention is of considerable importance since the whole mechanism can be fitted as a complete unit to a transportable and not necessarily permanently installed machine frame 14.

Using steel strips which have not been trimmed at the edges, there is frequently a substantial tolerance in width which adversely affects the helical welding seam produced within the shaper box to a serious extent. In order to avoid this objection, the invention provides on the two sides of the guide rails 20a and 20b, trimming device consisting for example of two circular cutters 27 and 27a and as a result of this arrangement, they require no special drive but permit satisfactory trimming of the strip edges using the available feed of the strip since the guide rails 20a and 20b, required in any event to prevent buckling of the strip, also hinder yielding at the strip edges.

In order to secure the control of the gap 1a' necessary for a satisfactory welding seam, the invention provides that the strip 1a coming from the reel 1 through the take-off rolls 17a and 17b and travelling through the gap between the rollers 18 and 19 is checked or tested at one or both longitudinal edges in its path to the shaper box. For this purpose in FIG. 4, a checking device 28 is shown which is electrically connected to a control motor 29 and imparts a control impulse thereto when the lateral edge of the strip 1a departs from its normal path. The control motor 29 operates, for example by means of a rack drive 30, on the support frame 31 for the reel 1 and rotates this to a small extent in the direction of the arrow about the pivot D. It will be seen that thereby a correction of the entry angle for the strip 1a is simultaneously obtained in the shaper box.

The shaper means or box includes a pair of feelers or checking elements 32 (FIG. 4) which engage the edges of the strip 1a forming the welding gap 1a' and any apparent or incipient changes in said gap are transmitted to a second control motor 33 located in proximity to the outlet of the shaper means. This control motor operates a support 35, by means of a chain drive 34 or the like, which displaces the finished formed and welded tube between small limits in the direction of the arrow.

For this reason, the carriage 3 which also serves as a cut-off carriage (see also FIGS. 6 and 7) is constructed as a cross carriage so that it can participate in the small lateral control movements which are involved. It is apparent that the pair of feelers 32 control not only the gap 1a' but simultaneously again the entry angle so that the best possible conditions are secured for a satisfactory welding operation. Likewise the feelers 32 can deliver directly and on their own initiative the necessary impulses for the control motor 29 so that also in this way the gap spacing 1a' can be controlled.

After the finished welded tube has left the shaper box 2 to a suitable length, it must be cut off or severed to length. As already stated, this severance is effected on the carriage 3 shown on a larger scale in FIGS. 8 and 9.

A movable or travelling frame 36 is adapted to travel on rails 5 by means of supporting wheels 37 mounted on axles 37'. In view of the fact that the tube leaving the shaper box entirely smoothly and axially, the frame 36 must compensate for such conditions. It will be seen that the wheels 37 at the left of the frame (FIG. 8) are grooved as at 37a for riding on a complementally shaped rail member 37b, whereas the wheels at the right of the frame have a smooth periphery 37c for riding on a planar rail member 37d on the rail 5. Spring means 38 surround each axle between the sides of the frame 36 and each wheel and by virtue of the above arrangement, the frame 36 can have a limited movement transversely to its direction of travel.

The frame 36 supports a milling cutter 40 mounted transversely to the longitudinal axis of the tube together with a follower or depth control roller 39. Vertically above the milling cutter 40 is located a cutting wheel or disc 41 and the cutter 40 and wheel 41 are carried by swingable support 40a and 41a pivotally connected to the frame 36 at 40b and 41b, respectively. The piston rods of hydraulic units 42 and 43 are respectively attached to the swingable supports 40a and 41a, whereby actuation of the hydraulic units adjusts the position of the cutter 40 and wheel 41 relative to the tube periphery.

Two counter rollers 44 journalled at one end of lever means 44a pivoted to the frame 36 at 44b function to guide the tube during severance. Each roller is controlled by a hydraulic unit 45 similar to the units 42 and 43 and the piston rod of the unit is connected to the other end of the lever means 44a. The downward movement of the rollers 44 is limited by abutments 46 on the frame 36 and a stop 47 on the frame coacts with a distance limit switch 48 on one of the rails 5. The frame 36 further supports a hydraulic pump 49 provided with electromagnetic valves 50 for controlling the hydraulic units 42, 43 and 45.

The treatment and severance of the tube is effected by means of a program selector which can be operated by the aforesaid stop 47 and the limit switch 48 which is controlled as follows:

On starting the hydraulic pump 49, the hydraulic medium operates the counter rollers 44 by means of the associated valve 50 so that these rollers are pressed against the tube. With some delay, the same valve 50 feeds the hydraulic unit 42 for the milling cutter 40 and brings the latter into operation so that it engages the tube and enters the wall thereof until the depth control roller 39 reaches the surface of the tube and thus limits the penetration depth of the milling cutter.

The continuous rotation of the tube is utilized as the feed for the cutting procedure and thereby a ring-shaped groove of V-profile is cut or milled in the tube as shown in FIG. 10. The profile angle $2\alpha$ amounts in the example shown to about 60°. After the groove depth has been cut, the hydraulic unit 43 (FIGS. 8 and 9) for the cutting wheel or disc 41 is operated so that after corresponding rotation of the tube, the latter is finally cut off and smoothed off at the same time.

The construction and depth of penetration of the cutter 40 as well as the width S of the cutting disc 41 are determined according to the height of the welding lip b which should be held at an exact value to agree with international standards.

Hence by the invention, the tube is not only severed by the use of the rotary movement thereof but simultaneously it is treated according to the international standards at its ends for tube lengths later to be assembled to form a pipe system, so that the separate lengths can be satisfactorily welded together after installation.

According to the invention, it is thus possible to secure a clean accurately worked tube end formation as a result of the most favorable treatment of the hard metal or other cutter means, for example a diamond faced milling cutter, and thus to perform a ready severance of the tube. The important advantage of the inclusion of the important severance by a milling type of cutter is obtained by the fact that the cutter merely mills a groove and the tube is not finally severed thereby. In this way, stability of the tube is maintained until the tube is treated around its whole periphery. If the milling operation severed the tube completely, there would be an excessively strong pressure on the cutter by the tube ends at the final severance phase and thus severe wear of the expensive milling cutter would be involved so that the economical conditions for the treatment would be reduced.

In order that the tube shall be prevented from vibration as much as possible during the severance, it is convenient to provide a weighted saddle or cradle G for example, in front of the carriage 3 (see FIGS. 6 and 7) which rests on the tube by means of rollers so that both the milling cutter 40 and also the cutting disc 41 are freed from the need to damp vibrations and the life of these two tools is consequently increased.

The carriage 3 on which the severance process is effected is connected with a front carriage 6 by means of a rod 7 on which the stop 4 already referred to is located and which is, for example, in the form of a swash plate or rocker disc.

After the end of the severance operation, the front carriage 6 pulls the cutter carriage 3 by means of the rod 7 so that double taper rollers 5b coupled with the driving motor 5a (FIGS. 6 and 7) are driven at a higher rate. Conveniently, the next section of tube is fed through the carriage 3 until the leading end engages the stop 4, whereupon the carriage 6 and the carriage 3 move in unison with the tube while cutting is performed. After this, the rollers 5b are accelerated and the cut tube offloaded, and thereafter the moving parts return over the leading end of the oncoming tube until the said end engages the stop 4.

In FIG. 11, a circuit diagram is shown which permits the completely automatic drive of the apparatus. In operation of the circuit care must be taken that the main driving motor 11 (see FIGS. 2 and 3) (not shown in the circuit diagram) is only started when the welding procedure has been commenced after the expiration of a definite delay period and the motor must be immediately stopped if the arc of one (or of either) welding electrode has not been struck or has been put out of action for any reason.

Furthermore, provision should be made both that tubes with only one or those with two welding seams, i.e. with inner and outer seams, can be produced and on failure of one electrode, the other electrode still remaining in operation is cut out. Further care must also be taken that the variations of current strength and voltage chosen for the automatic welding operation must be automatically adjusted to their standard values, if during the operation an undesired alteration of these values should appear.

As will be seen from the circuit diagram of FIG. 11 two welding electrodes $E_i$, $E_a$ are provided for the internal and external welding of the tube to be produced. By operating a control selector switch 51, it is possible to bring into operation only one or both of the electrodes.

Since on starting the driving motor there is the danger that the tube leaving the device could damage the severing assembly 40 and 41 (FIGS. 8 and 9) while in the rest position, care must be taken that the starting of the plant is only possible when the severing assembly is operative.

The paths for the operating current and for the control currents will now be described on the basis of the circuit diagram of FIG. 11.

First, a switch contact 55 is actuated which is provided for the operation of the severing assembly 40, 41. This also energizes a relay coil 56 to close contacts 56a and 56b, thereby lighting an indicator lamp 57. Next, a switch contact 62 is operated serving for starting the main driving motor 11 through a suitable starter device of conventional pattern.

Next, the selector switch 51 is actuated in the switch position I (for internal welding only) and the following circuit results:

A coil 52 is energized and closes the operating contacts 52a, 52b, 52c, 52d, 52e, of this coil. By an automatic switch contact 53 and associated coil 53a, a further coil 54 is energized which in turn closes the work contacts 54a, 54b, 54c, 54d, 54e and thereby an auxiliary or holding circuit for the relay 52 is closed.

At the same time, the coil 59, 61 and 63 are energized so that the electrode $E_i$ must strike the arc, after expiration of a period determined by the automatic switch contact 53, through a fuse 64 and a coil 65 with work contacts 65a, 65b, 65c, that is the work contacts 65a, 65b and 65c must close or otherwise the switch contact 53 will open the feed from the relay coil 52.

In this switch position, the coil 66 is simultaneously energized through contact 67 and coils 65 and 59, and a switch 66a operating as a time contact runs off and further connects another coil 70 via coil 66 and contacts 56a and 69a, which coil 70 supplies the current for the forward movement to the main driving motor (not shown).

In switch position II (internal and external welding), a contact 55 is again actuated initially whereby the coil 56 is energized and the contacts 56a close so that the indicator lamp 57 is lighted. Then the contact 66a is actuated so that the main driving motor is made ready for operation. Next, the main selector switch 51 is shifted to position II, whereby the coil 66 is energized via contact 67 and the relay coils 65 and 71 with contacts 71a, 71b, and 71c as well as the relay coils 58 and 59. The timing device 66a runs off and makes further connections via coil 66 and contacts 56a and 69a to coil 70.

In switch position III (external welding only), first the contact 55 is actuated in the same way whereby again coil 56 is energized and the contacts 56a for the indicator lamp 57 are closed. Then contact 66a is actuated and the main driving motor is ready for operation.

Now the operation selector switch 51 is placed in position III whereby the relay coil 66 is energized via contacts 67 as well as coils 58, 60 and 62 and the circuit breaker 68. The further circuit is the same as described for switch positions I and II.

From the foregoing, it will be seen that during the course of the welding process, the holding coil 54 for the main drive motor is held by the welding current relay 65 or 71. If for any reason a welding arc is interrupted, i.e. if any of the welding ceases, whether internal or external, the holding coil 54 for the main drive motor becomes disconnected because of the release of the corresponding welding current relay 65 or 71. The whole plant is thus brought to a standstill.

Simultaneously also the welding current of an electrode still in operation is automatically interrupted in order to prevent the electrode being burnt through.

Before restarting the plant the control selector switch 51 for the welding electrodes $E_a$ and $E_i$ must be brought to the normal or rest position.

The main driving motor is furthermore provided with an electromagnetic brake (not shown), which is released automatically during operation of the motor and immediately stops it without overshoot when the motor is cut off. There is the possibility of releasing the brake by means of a selector switch so that the rolls 18 and 19 shown on FIG. 2 can be rotated by hand. This is of advantage for the fine adjustment of both strip edges for performing the cross welding seam.

If for any reason there is a variation of the pre-set values of current strength or voltage selected for the automatic welding operation, these values are automatically returned to their pre-set values.

This is obtained for example in the case of external welding with the electrode $E_a$ in the following manner:

In the feed to the electrode $E_a$, there is provided a current responsive relay 72 which operates intermediate switch contacts 72a or 72b on reaching a minimum, respectively maximum value for the current.

A measuring lead for the welding voltage includes a voltage responsive relay 73 which operates intermediate switch contacts 73a respectively 73b on reaching a maximum or minimum value of the welding voltage.

The switch contacts 72a and 72b respectively 73a and 73b, receive current via switch contact 52e or 54e and lead to on-normal contacts 75a or 74a and thence to the relay coils 74 or 75 respectively.

The two coils 74 and 75 influence the control or regulating motor M for a welding current source G and regulate both the current strength and voltage in case of deviation of the output values from the preselected values. The same result applies correspondingly for internal welding for which purpose the welding current relay 76 for the electrode $E_i$ cooperates with a relay 77 and switch contacts 76a and 76b respectively 77a and 77b and on-normal contacts 78a or 79a as well as relay coils 78 or 79 respectively.

The coils 74, 75, 78, 79 can naturally also be controlled or corrected additionally by hand with the aid of fault detection devices or the like.

Reference characters 80, 81, 82, 83 designate key-operated or press-button switches by which the forward and rearward idling operation of the main driving motor, for example for introducing a new steel strip, can be regulated.

FIGS. 12, 13 and 14 show how steel strip 810, coming from roll frame 820 and hindered from kinking or buckling by guide rails 89, is guided into shaper box 86 by lateral guides 830 which project into the box 86 in such manner that the entry position of the strip edge coming from above through the shaper box 86 can be held under control by means of a control device 84. 85 is a control support and 87 a welding device by which the helical butt joint of the strip is welded to form spiral tube 88.

As shown in FIGS. 15 to 22, steel strip 132 is supplied from a pair of rolls 130 which likewise is operated from a drive system 131 and is held by lateral guide jaws 128 and 129 against lateral wandering. Guide rails 135 deter any kinking or buckling of the steel strip which moves, on entering shaper box housing 101 between shaper rolls 110 and 111, whereby it receives a curvature corresponding to the desired tube diameter. In order to hinder wandering of roll carrier 112 in the axial direction of the tube, it is held in position by means of guide rails 113. According to the inclined positioning of the shaper box casing 101 to main frame 106, the steel strip is formed helically to a tube 133 which travels outwardly in the direction of the arrow A in FIGS. 16 and 17.

The precise diameter of the tube is in this case determined by previously adjusted plungers 102 whereby shaped rollers 103 located at the ends of the plungers, position themselves obliquely according to the pitch of the tube turns. The same effect is obtained if the plunger ends are equipped with presser balls 141 as shown in FIG. 22. In the same way, the shaper rolls 110 and 111 are self-adjusting. In the present example, the plungers are shown as being adjustable by means of screw threads. Thus the machine can be adjusted for various diameters of the tube and as in the previous case a large tube 134 can be formed.

FIG. 15 shows the shaper box within a machine for producing tubes with a helically disposed welding seam.

The shaper rolls 111 are fastened for example as shown in FIG. 18 beneath the roll carrier 112 with toothed segments and can be rocked by means of a rack 123 and a pinion 125 driven by an adjusting motor 124. This has the result that the angular positioning of the shaper rolls can be altered and the steel strip, which is held before entering into the shaper box casing by guide jaws 128, is forced more forcibly towards the left hand or right hand guide jaw 128. These pressure alterations are obtained according to the invention as follows:

The tube 133 travelling out of the shaper box and which is finished in substantial lengths and is severed in the course of the manufacturing operation, has a progressing changing length. It lies on a take off track and exerts a more or less great resistance in the exit direction A upon the steel strip 132 which receives its terminal feeding motion from rolls 130. The resulting varying, and sometimes unduly great pressure of the steel strip for example against the right hand guide jaw 128, is measured, as shown in FIG. 16, by means of a pressure head 126 arranged beyond the same whereby the rack 123 (FIG. 18) is moved through an adjusting member 127 of drive motor 124 in such manner that the shaper rolls 111 are set in that direction which permits the travelling steel strip to wander slightly to the left so that the guide jaw 128 is released from pressure.

By means of this adjusting member, the result can also be obtained that the steel strip 132 running into the shaper box 101 travels, despite the variable counter forces as a result of a more or less long tube, with minimum pressure differences and comparatively without constraint by the guide jaws 128 and no undesired angular alteration is produced between the strip and the tube. This regulating procedure can naturally be performed still more rapidly and effectively if all the remaining shaper rolls such as 110 and 103 are automatically adjusted in the same way or in similar manner.

In order to obtain an enhanced forming or shaping action of the steel strip 132 to attain the required tube diameter, roll carrier 112 must exert by means of its shaper rolls 111 a pressure on the incoming steel strip which is determined as accurately as possible. It must be possible to control this pressure constantly and to modify the same also according to the constructional conditions, and, furthermore, according to the strength and quality of the steel strip. For this purpose, a support body 116 is located on the roll carrier 112 as shown in FIG. 17 on which the desired pressure is applied by means of a hydraulic piston 117. A pressure gauge 118 permits a precise continuous control of the pressure. The forces thus exerted are absorbed by main frame 106 and cross members 108, the latter being joined together by means of supports 109 and roll stand 136. Advantageously, the whole shaper box 101 is rotatably supported in a bearing ring 104 for adjusting the desired pitch between the steel strip 132 and the tube 133, the pivot being shown at 105.

Since it is of the greatest importance that the pressure of the shaper rolls 111 on the steel strip shall be uniformly applied, there is a further possibility of adjustment by means of a hydraulic cylinder 119 or the like at the rear end of the roll carrier 112 which can moreover be exactly proportioned by the fact that the pressure necessary for this purpose can be read from a pressure gauge 120. A further control is provided by means of a built-in spirit level 121.

The roll carrier 112 is made of box shape and holds welding arm 114 with weld wire feed motor 115 at the end thereof. During the shaping of the steel strip to the tube form, the internal seam for the finished tube is formed at welding point 137.

According to FIG. 19, a support arm 138 which projects from the roll carrier 112 carries a copper shoe 139 at the end and which shoe is pressed against the tube wall as an under support at outer welding point 140.

As shown in FIGS. 23 to 26, steel strip 201 which is drawn from reel 202 passes through a trueing or straightening roll train 231 resting on rollers 232, into a feeding roll stand which, as shown also in FIG. 25, consists of frame 203 and lower and upper rolls 204, 205 which are forced one towards the other by means of hydraulic units 206 and 207. The torque is transmitted to the rolls through jointed shafts 209 and 210 from a roll drive 211.

The roll frame 203 is rotatably supported by means of a pin 212 in an upper cross member 215 and by a pin 213 in a lower cross member which form, together with stands 216, 217 and 218, the machine frame. The rotation of the feeder roll stand is effected by means of a toothed ring 208 and drive means 229.

After steel strip 201 has passed out of the feeder roll stand, it is held down by two guide rails 219 and 220 as shown in FIGS. 23 and 24 and inserted between two lateral guide jaws 221 into a sleevelike shaper tool or box 222 in which bending or shaper rolls 224 and 225 are supported in a holder 223. These rolls 224 and 225 are driven from a drive unit 228 by means of jointed shafts 226 and 227.

Rolls 233 are shown by which the trueing roll trains 231 resting on the rolls 232 is supported against the machine stands 216. On both sides of the strip 201 there is located, as shown in FIG. 24, in each case a guide jaw 234 or 235 for the strip edges with associated pressure measurement head. The tube leaving the shaper box is shown at 236.

In its path from reel 202 up to the shaper box 222, the steel strip 201 is guided only between the jaws 234 and 235 before entering the feeder roll stand 203, 204, 205 and between the jaws 221 before entering the shaper box 222. This positive guide path, in contradistinction to the previously described arrangements in which the spacing between the feeder roll stand and the shaper box is made as small as possible in order to avoid buckling of the steel strip over this section, is not made too small so that there will be sufficient time for the strip held down by the rails 219 and 220 to become stress-free from the constraining influences exerted thereon. In practice, a spacing of about 2.4 m is satisfactory.

In the constructional example described, the pressure heads serving for relieving stresses in the steel strip are provided on the two jaws 234 and 235. If therefore by inaccuracies of the steel strip travel, whether through thickness tolerances or thinning at the edge, the strip should tend to wander to one side or the other, there appears an increase in pressure against the strip guide jaws 234 or 235 which may be so great that destruction of the strip edges may follow. This increase in pressure has the result that the whole feeder roll stand 203, 204, 205 becomes twisted since the pressure heads registering this increase in pressure, transmit the pressure to the known booster means which in turn operate the drive 229 for rotating the toothed ring 208 so that the whole feeder roll stand is turned. This turning has the result that the longitudinal axes of the rolls 204 and 205 are also turned towards an imaginary mid-axis of the steel strip so that analogously a continuing drive of the steel strip travelling through the rolls occurs on that side which produces an excessive pressure on the strip guide jaw 234 or 235 concerned.

Another possibility of pressure regulation is comprised also in FIG. 26 by the fact that a bearing block 237 is displaceably mounted within the feeder roll stand and is movable in the horizontal direction of the roll whereby the pressure measurement described is operative upon a hydraulic circuit which moves the pistons in hydraulic cylinders 238 and 239 in such manner that a turning of the feeder rolls is effected for example in opposed shaper roll carrier 240 whereby bearing block 237 is moved backwards and forwards in the direction of the arrow. Also in this case, an angular alteration occurs between the roll axis and the guide for the strip which results in the same effect as above described.

Another possibility for regulating the travel of the strip is obtained by the fact that the pressure heads shown in FIG. 25 act upon the hydraulic units 206 and 207 and subject these units to differing pressures to that as a result of this differential pressure adjustment on the roll bearings there is likewise a tendency for the strip to be driven analogously to the left or right which produces the desired relieving of the edge of the strip concerned.

In order to obtain the greatest possible degree of freedom in the guiding of the steel strip through the strip guides 221 and the strip guide jaws 234 and 235, the trueing roll train 231 placed in front of the feeder roll stand is, as already stated, placed on support rollers or rails. With this arrangement, possible lateral displacement forces which may appear by the strip being firmly clamped in the trueing roll train, are allowed for by free lateral yielding of the roll frame.

I claim:

1. In an apparatus for manufacturing spirally welded tubing from a metal strip and which apparatus is of the type which includes shaping means for shaping a running length of strip into a spiral tube, welding means located in relation to the shaping means and the path of movement of the strip so as to form a spiral weld during movement of the strip through the shaping means whereby a spirally welded tube emerges from the shaping means and means for feeding said strip to and through the shaping means, the improvement comprising movable means engageable with the strip in advance of the welding means for shifting the strip laterally of its line of movement to ensure that the movement of the strip in its passage through the shaping means is such that the edge surface to be welded arrives at the welding point in proper relation to that strip edge surface to which it is to be welded, means for moving such movable means to laterally shift the strip, sensing means engageable with at least one edge of the strip in advance of the welding point for determining inaccuracies of strip feed movement relative to the welding point and means operatively interconnecting said sensing means with the means for moving said movable means to operate the latter to automatically shift the strip laterally as required to ensure formation of a proper welding seam.

2. In an apparatus for manufacturing spirally welded tubing from a metal strip and which apparatus is of the type which includes shaping means for shaping a running length of strip into a spiral tube, welding means located in relation to the shaping means and the path of movement of the strip so as to form a spiral weld during movement of the strip through the shaping means whereby a spirally welded tube emerges from the shaping means and means for feeding said strip to and through the shaping means, the improvement comprising movable means engageable with the strip in advance of the welding means for shifting the strip laterally of its line of movement to ensure that the movement of the strip in its passage through the shaping means is such that the edge surface to be welded arrives at the welding point in proper relation to the strip edge surface to which it is to be welded, means for moving such movable means to laterally shift the strip, sensing means engageable with at least one edge of the strip in advance of the welding point for determining inaccuracies of strip feed movement relative to the shaping means and means operatively interconnecting said sensing means with the means for moving said movable means to operate the latter to automatically shift the strip laterally as required to ensure formation of a proper welding seam.

3. Apparatus as claimed in claim 1 in which the strip is constituted by a coil, the means for feeding the strip including superposed coacting feed rolls, means supporting the coil in friction drive relationship with the feed rolls so that the strip is fed at a speed determined by the speed of the feed rolls, and means for imparting reversible rotation to at least one of the feed rolls.

4. Apparatus as claimed in claim 3 in which said coil rests directly on the upper feed roll and the means mounting the coil disposes the axis thereof offset to the axis of the feed roll so that the strip engages approximately one-half of the periphery of the upper feed roll in its feeding movement.

5. Apparatus as claimed in claim 1 in which the strip is constituted by a coil, the means for feeding the strip including superposed coacting feed rolls, means supporting the coil in friction drive relationship with the feed rolls so that the strip is fed at a speed determined by the speed of the feed rolls, means for imparting reversible rotation to at least one of the feed rolls, and at least one intermediate roll disposed between the coil and the upper feed roll so that the strip in passing from the coil to the feed rolls follows an arc corresponding to the natural roll-off curvature of the strip.

6. Apparatus as claimed in claim 1 in which the strip is constituted by a coil, the means for feeding the strip including superposed coacting feed rolls, means supporting the coil in friction drive relationship with the feed rolls so that the strip is fed at a speed determined by the speed of the feed rolls, means for imparting reversible rotation to at least one of the feed rolls, cross-welding means arranged between the feed rolls and the shaping means for welding the trailing end of one strip to the leading end of a subsequent strip, a feeder plate, and means supporting said feeder plate for movement in alignment with and toward and away from the gap between the feed rolls so that the feeder plate can be fed into the gap between the feed rolls after the passage of the trailing end of a strip to advance such trailing end to a position adjacent the cross-welding means whereupon the feed rolls can be reversed, said feeder plate returned to its original position and the leading end of a subsequent strip can be introduced into the gap between the feed rolls for movement to a position where it can be welded to the trailing end of the preceding strip.

7. Apparatus as claimed in claim 1 and supporting means for the means for feeding said strip including a frame mounted for turning movement about a vertical axis, the movable means engageable with the strip for shifting the strip laterally comprising the means for feeding the strip, the means for moving said movable means being operably connected to said frame.

8. Apparatus as claimed in claim 7 and further comprising means for moving the completed tube laterally.

9. Apparatus as claimed in claim 1 and supporting means for the means for feeding said strip including a frame mounted for turning movement about a vertical axis, the movable means engageable with the strip for shifting the strip laterally comprising the means for feeding the strip, the means for moving said movable means being operably connected to said frame, and said sensing means including sensing elements disposed directly in advance of the welding point and operative to control the movement of said frame to maintain the distance between the strip edges immediately in advance of the welding point at a substantially constant value.

10. Apparatus as claimed in claim 1 in which the means operatively interconnecting the sensing means with the means for moving the movable means include delay means operative to prevent lateral shifting of the strip in the event of minor inaccuracies.

11. Apparatus as claimed in claim 1 and the movable means engageable with the strip for shifting the strip laterally including means engaging the surface of the strip during its shaping.

12. Apparatus as claimed in claim 11 in which the means engaging the surface of the strip comprise a plurality of rollers mutually spaced apart and turning in parallel planes, support means for each roller including a vertical shaft, means for simultaneously turning said support means about such shafts to turn the planes of the rollers so that in response to operation of the sensing means the turning of the rollers effects an adjustment of the angle between the direction of motion of the strip and the parallel planes of rotation of the rollers in accordance with the strip inaccuracies detected by the sensing means.

13. Apparatus as claimed in claim 12 in which said rollers constitute part of the shaping means, said shaping means including three rows of rollers arranged for rotation in mutually spaced parallel planes and with two rows constituting outer rows engaging one side of the strip and the third row constituting said turnable rollers and being mounted on the side of the strip that forms the interior of the tube.

14. Apparatus as claimed in claim 13, the means supporting said turnable rollers includes a roller carrier, and hydraulic pressure operated means mounted to exert a controllable pressure on said carrier to press said rollers against the strip to bend the strip to the desired radius.

15. Apparatus as claimed in claim 14 and a second hydraulic pressure operated means engageable with said roller carrier to counteract the pressure of the first-mentioned hydraulic pressure opeated means, said second hydaulic pressure operated means being located adjacent the end of said carrier that is remote from said first hydraulic pressure operated means so as to be capable of tilting said carrier so that all rollers are simultaneously pressed against the surface of the strip.

16. Apparatus as claimed in claim 1 and further including means for shifting the finished tube laterally, additional sensing means operatively interconnected with the means for shifting the finished tube to effect adjusting movements of the finished tube as a further correction for improper positioning of the strip edges relative to the welding point, means for severing the finished tube into predetermined lengths including a carriage movable axially with and by the tube as it emerges from the shaping means and severing means carried by said carriage and mounted for lateral shifting movement in order to compensate for any lateral shifting movement imparted to the tube in response to actuation of such additional sensing means.

17. Apparatus as claimed in claim 1 in which the means engageable with the strip for shifting the strip laterally and the means for feeding the strip include a pair of coacting superposed rollers engaging opposite surfaces of the strip, a frame means including bearing components journalling said rollers and the means for effecting movement of the movable means comprising means for turning said frame means about a vertical axis, to thereby vary the angular relation of the rollers relative to the initial line of movement of the strip so as to shift the strip.

18. Apparatus as claimed in claim 17 and further including means for varying the angular relation of the respective rollers in a vertical plane.

19. Apparatus as claimed in claim 1 in which the means engageable with the strip for shifting the same comprise the means for feeding said strip and includes a pair of superposed coacting feed rolls, means mounting said rollers for shifting movement in a horizontal plane and said sensing means being operative to so shift said feed rollers.

20. In apparatus for manufacturing spirally welded tubes from a metal strip, a reel on which the strip is wound, shaping means for coiling the strip into a helix, feed roll means arranged in advance of the shaping means, means for driving such feed roll means, means mounting the coil in friction drive relationship with the feed roll means so that when an end of the coil is introduced into the feed roll means the drive of the latter will drive the coil at a speed corresponding to that imparted to the feed roll means, welding means associated with the shaping means for welding the adjacent curved lateral edges of the coiled strip to provide a helical seam and produce a tube, said shaping means having an inlet, guide means cooperable with said inlet for guiding the inner lateral edge of the strip to ensure proper positioning thereof relative to the welding means and means for maintaining the inner lateral edge of the strip against said guide means.

21. In apparatus for manufacturing spirally welded tubes from a metal strip, a reel on which the strip is wound, shaping means for coiling the strip into a helix, feed roll means arranged in advance of the shaping means, means for driving such feed roll means, means mounting the coil in friction drive relationship with the feed roll means so that when an end of the coil is introduced into the feed roll means the drive of the latter will drive the coil at a speed corresponding to that imparted to the feed roll means, welding means associated with the shaping means for welding the adjacent curved lateral edges of the coiled strip to provide a helical seam and produce a tube, said shaping means having an inlet, severing means cooperable with the completed tube exteriorly of the shaping means for cutting the completed tube into sections of desired length and for simultaneously finishing the severed ends, means responsive to continued operation of the welded means for controlling the operation of the welding means, the drive means for the feed roll means and the severing means, additional means operably coupled to the feed roll means and the severing means for sequentially actuating the welding means, the severing means and the drive for the feed roll means, and means operably connecting the means that are responsive to the operation of the welding means to at least the welding means and the drive for the feed roll means so as to interrupt the operation of the latter two means upon improper functioning of said welding means.

22. In the production of spirally welded tubes from metal strips in which the strip is fed into shaping means positioned obliquely to the normal linear path of travel of the strip and in which the strip is gripped from above and below at only one point in advance of the shaping means and in which the strip is welded into the tube at a welding point at the shaping means, the improvement comprising utilizing force reactions that result from inaccuracies in the travel of the strip between the feed means and the shaping means for compensating for inaccuracies in strip travel to ensure proper positioning of the strip edges at the welding point.

References Cited in the file of this patent
UNITED STATES PATENTS

| | | |
|---|---|---|
| 1,793,381 | Freeze | Feb. 17, 1931 |
| 1,795,380 | Stresan | Mar. 10, 1931 |